July 5, 1927.
J. J. SERRELL
1,635,150
SPRING CROSS YIELDABLE COUPLING
Filed Feb. 29, 1924
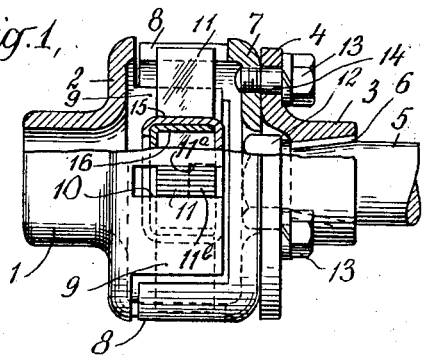
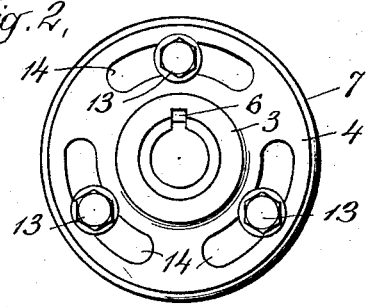
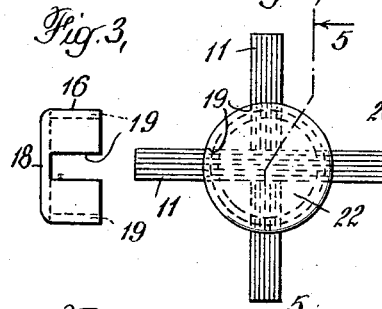
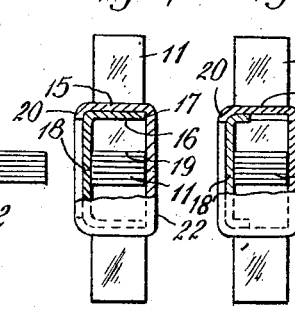
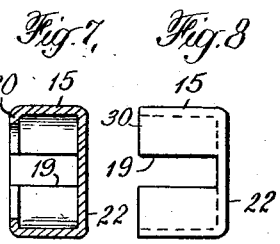
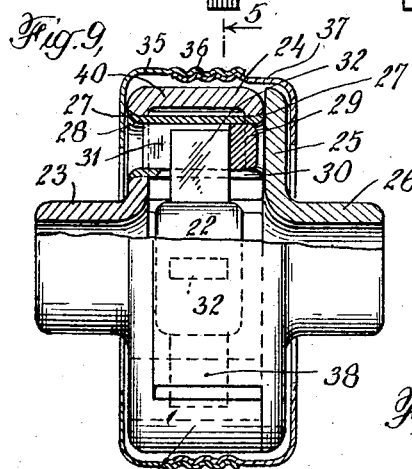
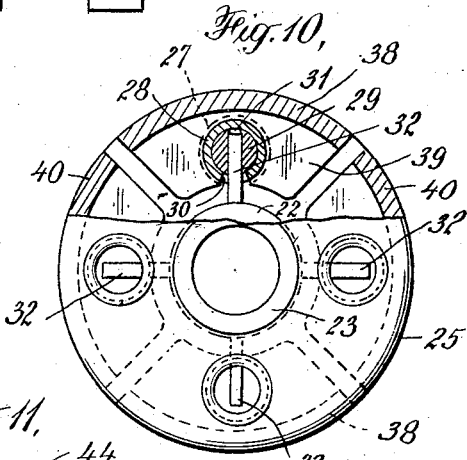
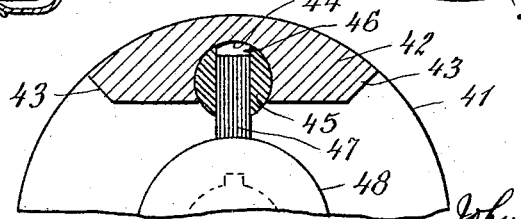
Inventor
John J. Serrell
By his Attorney
Harry L. Duncan Patented July 5, 1927.

1,635,150

UNITED STATES PATENT OFFICE.

JOHN J. SERRELL, OF ELIZABETH, NEW JERSEY, ASSIGNOR TO SMITH AND SERRELL, OF NEWARK AND MAHWAH, NEW JERSEY, A COPARTNERSHIP CONSISTING OF JOHN J. SERRELL AND ROBERT A. SMITH.

SPRING-CROSS YIELDABLE COUPLING.

Application filed February 29, 1924. Serial No. 696,102.

This invention relates especially to yieldable couplings of the spring cross type which, for small powers, may be cheaply and effectively made with pressed steel coupling members which may comprise integral hubs and flanges and peripheral projections loosely interlocking in the two coupling members and provided with slots so that each coupling member has one or more sets of diametrically arranged slots to be directly engaged by or cooperate with the diametrically located resilient arms of the interposed connecting member or spring cross, which may have two or more sets of laminated radial spring arms securely connected by one or more slotted interlocking securing cups or other suitable central securing members. The laminated springs forming the spring cross may advantageously be slotted at their central portions so as to be interlocked and with different arrangements of slots three or four sets of these laminated spring arms may be arranged at the desired circumferential distance apart and permanently and preferably substantially rigidly connected at their central portions so as to make a resilient connecting member having radially projecting spring arms to yieldingly transmit the torque from one coupling member to the other.

In the accompanying drawing showing in a somewhat diagrammatic way several illustrative embodiments of this invention:

Fig. 1 is a side view partly in section of one form of coupling.

Fig. 2 is the corresponding end view thereof.

Fig. 3 shows in separated position one of the slotted securing cups.

Fig. 4 is an axial or end view of the spring cross connecting member.

Fig. 5 is a sectional view thereof taken along the line 5—5 of Fig. 4.

Fig. 6 is a corresponding sectional view of a slightly modified construction.

Fig. 7 shows in separated position one of the outer securing cups adapted to cooperate with the Fig. 3 inner cup.

Fig. 8 is a corresponding view of the Fig. 7 cup before its locking flange is bent over.

Fig. 9 is a side view, partly in section, of another form of coupling.

Fig. 10 is a corresponding end view, and

Fig. 11 is a detail end view showing another construction.

It is desirable for small sized couplings to make the main coupling members of stamped sheet metal such as sheet steel an eighth to a quarter of an inch thick more or less, depending on the sizes of the units desired, and one or both of the cooperating coupling members may, as indicated in Fig. 1, comprise a hub 1 and integral flange 2 on which may be stamped up the integral peripheral projections 9 which are adapted to loosely interlock with the corresponding peripheral projections 8 on the cooperating coupling member, slots 10 being provided in these projections to accommodate the radial spring arms 11 of the spring cross or resilient connecting member interposed between these two parts. As shown in Fig. 1, one of the coupling members may be of the angularly adjustable type desirable for magneto work and for this purpose the hub 3 which may, if desired, be secured to the shaft 5 as by the key 6, may be formed with the adjusting flange 4 provided with a series of circumferential adjusting slots 14 through which may extend the adjusting bolts 13 secured in the connecting flange 7 with which the peripheral projections 8 may be integral, if desired.

A convenient and desirable way of forming the spring cross connecting member which may have its laminated spring arms 11 formed with cooperating slots such as 11$^a$ through which the reduced width central portions 11$^b$ of the other set of springs may extend, is illustrated in Figs. 3 to 8 where one or more slotted interlocking securing cups of stamped sheet metal are illustrated as securely connecting the central parts of the spring cross connecting member. Where two such spring cups are used one of them may have the form shown in Figs. 3 and 5 where the flat part 18 of this cup may be formed with the slotted flange 16 having, if desired, milled or stamped out slots 19 of such width as preferably to closely engage the laminated spring arms 11 to which the cup may be secured in any suitable way. As shown in Fig. 5, an outer cup of generally similar stamped sheet metal may comprise the end 22 and flange 15 which may originally be of the shape shown in Fig. 8 so as to be slipped over the spring arms and inner cup, the edge 30 of this flange 15 extending an eighth or a quarter of an inch at least beyond the bottom or side wall 18 of the inner cup so that when this flange edge is turned or flanged over in a suitable closing machine it may form the locking flange 20 securely holding these cups together and forming a strong and reliable central securing member for the two sets of radial spring arms. Of course, if desired, similar locking flanges may be formed on each of the two interlocking cups or in some cases, the inner cup, as shown in Fig. 6, may have a considerably shorter flange such as 21, stamped up integral with the bottom or side wall 18' of this cup and formed with similar slots to preferably tightly engage the laminated spring arms. In this way, whether one or two of these interlocking securing cups are employed, a unitary spring cross may be cheaply and effectively produced so as to be practically interchangeable and of course the diametrically opposite radial spring arms 11 of this spring cross connecting member shown in Fig. 4 may be arranged in the diametrically opposite slots of one of the coupling members of Fig. 1 while the other diametrically opposite set of spring arms similarly engages the slots in the other coupling member so that all the driving force between the coupling members is transmitted through these laminated spring arms to secure the desired resilient yielding and cushioning action of the coupling combined with a considerable extent of play to take care of misalignment of the two shafts or other connected members.

Figs. 9 and 10 show another form of coupling in which, if desired, the coupling members, such as 23, may be formed with stamped up sheet metal flanges and interlocking peripheral projections 40 which may at the other side 24, be bent downward and inward sufficiently to form at least a partial flange of sufficient extent to hold a series of slotted supporting tubes 28 which may have their ends 27 flanged out somewhat to securely engage the holes in these opposing flanges of the coupling member. As shown more in detail in Fig. 10, this supporting tube may have a slot 30 on its inner wall so as to allow ample play for the laminated or other spring arm 32 which may extend into the tube and engage a slotted contact pin 29 which may turn freely within this tube so as to avoid cramping and localized wear on the ends of the spring arms. These contact pins may have, as indicated in Fig. 9, the slots 31 extending to one end of the same so that they may be conveniently slipped into these supporting tubes around the spring arms and be held in this position by the cooperating flange 25 of the other coupling member which may be similarly formed with peripheral projections 38 loosely interlocking with the projections 40 and provided, if desired, with an integral hub 26 for connection with the other shaft or driving member of any suitable description. The loosely interlocking character of these peripheral projections on the coupling member may allow a definite amount of resilient angular yield between the two coupling members so as not to overstrain or break the laminated spring cross or other yielding connecting member employed and, if desired, a threaded two-part sheet metal cover may be arranged outside of the flanges and projections, the two parts, 35 and 37, of this thin sheet metal cover being connected by the cooperating rolled threaded portions 36.

In some cases of course, especially with the somewhat larger sizes of couplings, the coupling members may be made of heavier solid construction such as shown in Fig. 11, as by casting processes, and the flange 41 of one of these members may be provided with the peripheral projections 42 having substantially radial faces 43 at each side and having a cylindrical supporting hole 44 in which the contact pin 45 may be loosely mounted so that it can turn through a considerable angle and properly support the laminated spring arm 47 in its slot 46. Such spring arms may be securely mounted in a cast or other central securing member 48 connecting the two or more diametrically opposite spring arms so that they have the desired extent of resilient yielding action.

This invention has been described in connection with a number of illustrative embodiments, forms, shapes, proportions, sizes, materials and arrangements, to the details of which disclosure the invention is not of course to be limited since what is claimed as new and what is desired to be secured by Letters Patent is set forth in the appended claims.

I claim:

1. The yieldable coupling, comprising two cooperating coupling members of heavy metal each formed with a flange and integral slotted peripheral projections loosely interlocking with the similar projections of the cooperating coupling member, and a resilient spring cross connecting member cooperating with the slots in said coupling members to cushion the driving forces between them, said connecting member comprising a plurality of sets of radial laminated spring arms having interlocking oppositely directed securing cups of stamped sheet metal formed with locking flanges and slots to accommodate said spring arms and hold their central portions together.

2. The yieldable coupling, comprising two cooperating coupling members each formed with a flange and slotted projections loosely interlocking with the similar projections of the cooperating coupling member, and a resilient spring cross connecting member cooperating with the slots in said coupling members to cushion the driving forces between them, said connecting member comprising a plurality of sets of radial straight spring arms having interlocking oppositely directed securing cups of sheet metal formed with slots to accommodate said spring arms and hold their central portions together.

3. In yieldable couplings, a resilient spring cross connecting member adapted to cooperate with two coupling members to cushion the driving forces between them, said connecting member comprising two sets of radial laminated spring arms having interlocking oppositely directed securing cups of stamped sheet metal formed with slots to accommodate the central portions of said spring arms and hold them together.

4. In yieldable couplings, a resilient spring cross connecting member adapted to cooperate with two coupling members to cushion the driving forces between them, said connecting member comprising two sets of radial laminated spring arms having interlocking oppositely directed securing cups to accommodate the central portions of said spring arms and hold them together.

5. In yieldable couplings, a resilient spring cross connecting member adapted to cushion the driving forces between two coupling members, said connecting member comprising two sets of slotted interlocked radial laminated straight spring arms and interlocking oppositely directed securing cups formed with slots to closely engage the central portions of said spring arms and hold them together.

6. In yieldable couplings, a resilient spring cross connecting member adapted to cushion the driving forces between two coupling members, said connecting member comprising two sets of radial interlocking laminated straight spring arms and a double cupped securing member to closely engage the central portions of said spring arms and hold them together.

JOHN J. SERRELL.